United States Patent [19]
Morey

[11] Patent Number: 5,191,754
[45] Date of Patent: Mar. 9, 1993

[54] SELF-PROPELLED COMPOST WINDROW TURNING AND AERATING MACHINE AND METHODS OF OPERATING THE MACHINE

[75] Inventor: Norval K. Morey, Weidman, Mich.
[73] Assignee: Wood Technology, Inc., Winn, Mich.
[21] Appl. No.: 900,577
[22] Filed: Jun. 18, 1992
[51] Int. Cl.$^5$ ............................................. A01D 84/00
[52] U.S. Cl. ................................... 56/13.3; 56/12.8; 56/14.7; 56/16.4; 56/365
[58] Field of Search ...................... 56/12.8, 12.9, 13.1, 56/13.2, 13.3, 14.7, 16.4, 16.6, 365, DIG. 5; 414/25, 132

[56] References Cited

U.S. PATENT DOCUMENTS

| | | | |
|---|---|---|---|
| 1,799,033 | 3/1931 | Willerton | 56/12.9 |
| 2,065,721 | 12/1936 | Mutzbauer | 56/13.2 |
| 2,349,386 | 5/1944 | Stoetzl et al. | 56/13.1 |
| 2,924,054 | 2/1960 | Myers . | |
| 2,926,477 | 3/1960 | Bebow | 56/12.9 |
| 2,955,403 | 10/1960 | McKee . | |
| 2,974,468 | 3/1961 | Lundell . | |
| 3,188,786 | 6/1965 | Sammet | 56/12.9 |
| 3,266,230 | 8/1966 | Rowbotham | 56/208 |
| 3,884,022 | 5/1975 | Landolt | 56/364 |
| 3,901,008 | 8/1975 | Taylor et al. | 56/344 |
| 4,188,160 | 2/1980 | Corbell et al. | 56/13.3 X |
| 4,703,614 | 11/1987 | Cooper et al. | 56/16.6 |
| 4,910,951 | 3/1990 | Reilly et al. | 56/376 |
| 4,976,095 | 12/1990 | Schnittjer | 56/350 |

Primary Examiner—George A. Suchfield
Attorney, Agent, or Firm—Learman & McCulloch

[57] ABSTRACT

A self-propelled compost windrow turning and aerating machine includes a longitudinally extending vehicle main frame supported on a pair of front wheels and a rear castered wheel. An upper longitudinally extending subframe is swingably supported from the rear end of the main frame to raise and lower the front end of the subframe relative to the main frame. A blower housing mounted on the subframe has a material admitting opening leading to a rotary fan provided in the housing, the blower housing having a discharge opening with a spout for directing material blown out of the housing. Material debridging and feeding mechanism supported on the subframe in advance of the blower housing removes material from a compost windrow and delivers it to the material admitting opening, and an engine drive system powers the front wheels, the fan, and the material debridging and feeding mechanism.

19 Claims, 4 Drawing Sheets

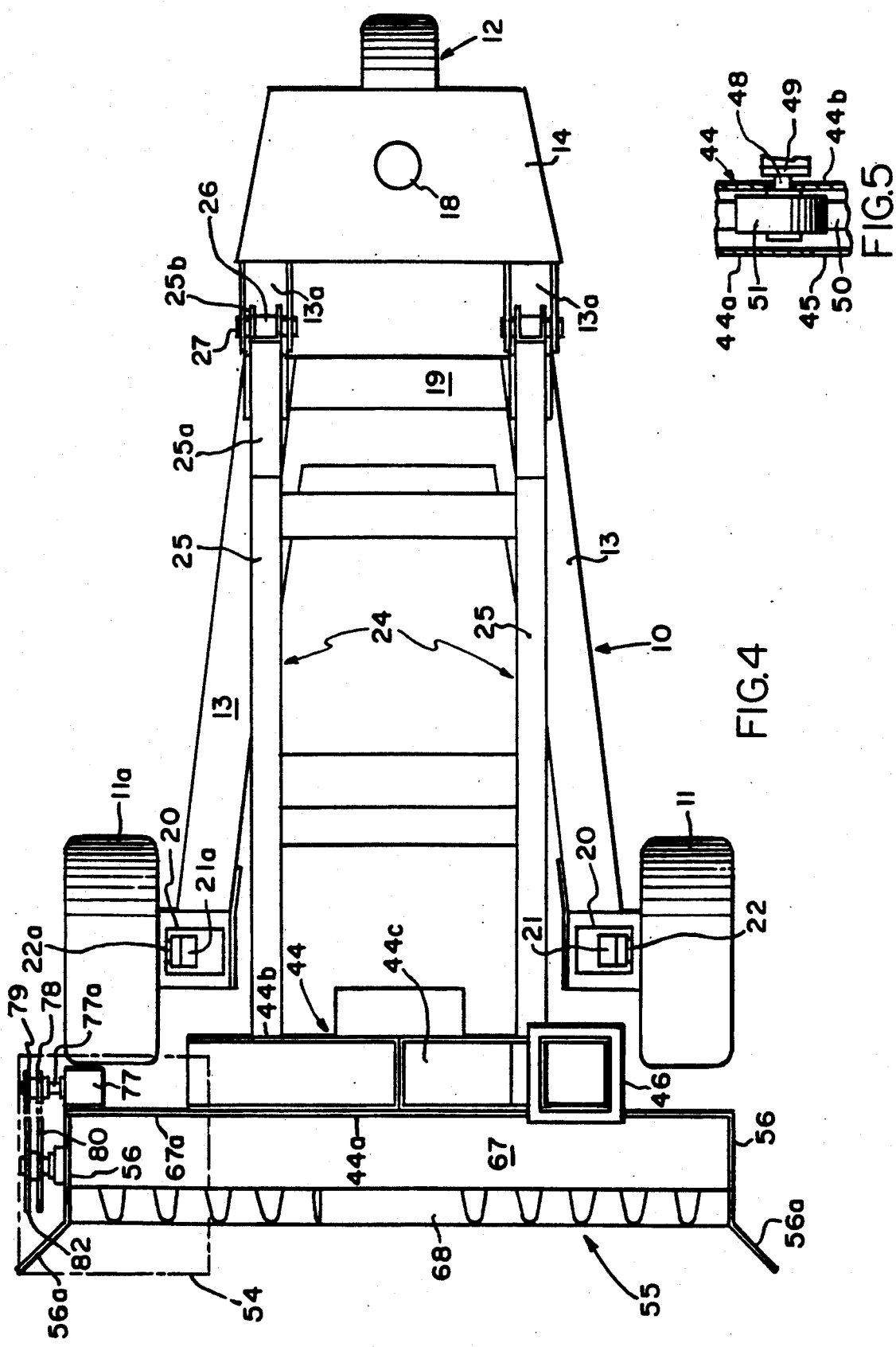

SELF-PROPELLED COMPOST WINDROW TURNING AND AERATING MACHINE AND METHODS OF OPERATING THE MACHINE

BACKGROUND OF THE INVENTION

This invention relates to compost windrow treating machinery and more particularly to self-propelled vehicles for traveling down the windrow and feeding the windrowed material to a blower which blows the material in a path to reform a windrow of the aerated material. The machine to be described is part of an organic waste material recycling system for treating windrowed waste material such as leaves, wood fragments, brush, paper, garbage and sludge, which have been windrowed to bacterially convert them to fertilizers and mulches.

The problems incident to the disposal of waste by communities and cities which have traditionally landfilled their waste is today exacerbated by a lack of available landfill sites in nearby geographic locations, with the result that composting is an option being utilized with increasing frequency. Typically, a wide variety of organic waste material is being chipped and ground to a size suitable for composting and then windrowed for bacterial decomposition. Systems of this type considerably reduce the waste volume and minimize landfill space requirements. They, further, produce natural organic fertilizers which are useful by farmers, golf course owners and others and, thus, offset the cost incurred by municipalities and companies in disposing of their huge volumes of waste. In order to decompose the organic waste material and convert them to fertilizer or a mulch that is relatively odorless, such composted materials must be aerated and turned on a regular basis, for instance, several times weekly. It is important to monitor the heat build-up in the pile and aerate the composted material when predetermined temperatures are reached. Such windrows of material may be a quarter of a mile long, and as much as up to fourteen feet in height, and up to eighteen feet in width. For a variety of reasons which will become apparent, the present invention is deemed a considerable improvement over known prior art machinery.

SUMMARY OF THE INVENTION

The present invention utilizes a vehicle having a longitudinally extending vehicle main frame and an upper longitudinally extending subframe which is supported from the rear end of the main frame for raising and lowering movement of the front end of the subframe relative to the main frame. The blower housing is mounted on the subframe and has a material admitting opening leading to a rotary fan. Material debridging and feeding mechanism is supported on the front end of the subframe in advance of the blower housing for removing material from the compost windrow and delivering it to the material admitting opening of the blower housing. A discharge spout on the blower housing directs material blown out of the housing in a stream to form a replacement windrow, either rearwardly of the machine or to the side of the machine. Depending on the size of the windrow, the machine may be moved continuously down the windrow, or started and stopped as required to collect and feed the material to the blower housing. While usually the machine can handle a single windrow with one pass, exceptionally wide windrows may be turned and aerated by moving along the windrow in an initial path and then back along a path adjacent to the initial path. Windrows of substantial height are debridged as the machine moves along the windrow. The present self-propelled vehicle comprises a pair of front wheels, each of which is independently reversibly driven, and a single castered rear wheel, which enables the machine to be virtually turned around on itself, or turned in a direction to laterally collect material when the windrow is of a somewhat greater width than the machine.

One of the prime objects of the present invention is to design a rapidly operating machine which entrains the composted material in large volumes of air.

Another object of the invention is to provide a turning and aerating machine which is capable of debridging the material as it is moved along the windrow.

Still another object of the invention is to provide a machine of the character described, which is capable of reforming a higher windrow of less width to the rear of the machine as it moves down a windrow.

Another object of the invention is to provide a self-propelled vehicle, having independently reversibly driven front wheels and a castered rear wheel, wherein a subframe is so supported that a great majority of the weight of the operable elements is borne by the front wheels rather than the castered rear wheels.

Another object of the invention is to provide a vehicle of the type described which is capable of selectively handling windrows of varying vertical height including windrows which may be as much as fourteen feet in height.

A further object of the invention is to provide a self-propelled vehicle which incorporates an engine drive system for not only powering the front wheels, but, also powering the material debridging and feeding mechanism and the blower fan.

A still further object of the invention is to provide a machine which greatly aids, and is an integral part of, the composting systems which are finding increasing use.

Still a further object of the invention is to design a high capacity compost turner, mixer and aerator which operates very efficiently to achieve a far superior aeration of the material, and is far less expensive to acquire and operate than known machinery.

Another object of the invention is to design a less complex windrow turner and aerator which is more durable, requires less maintenance, and has less down-time than conventional machinery.

Still a further object of the invention is to design a machine which can be readily operated by relative unskilled personnel.

Other objects and advantages of the invention will become apparent with reference to the accompanying drawings and the accompanying descriptive matter.

THE DRAWINGS

FIG. 2 is a similar, fragmentary view illustrating a transport position of the subframe which supports the engine system, the blower housing, the debridging and material collecting and feeding mechanism, and the operator cab;

FIG. 3 is a schematic front elevational view of the machine in the position in which it is shown in FIG. 1;

FIG. 4 is a schematic top plan view thereof, certain elements being omitted in the interest of clarity;

FIG. 5 is a fragmentary sectional plan view which portrays the blower fan shaft;

DESCRIPTION OF THE PREFERRED EMBODIMENT OF THE INVENTION

Figure 1:
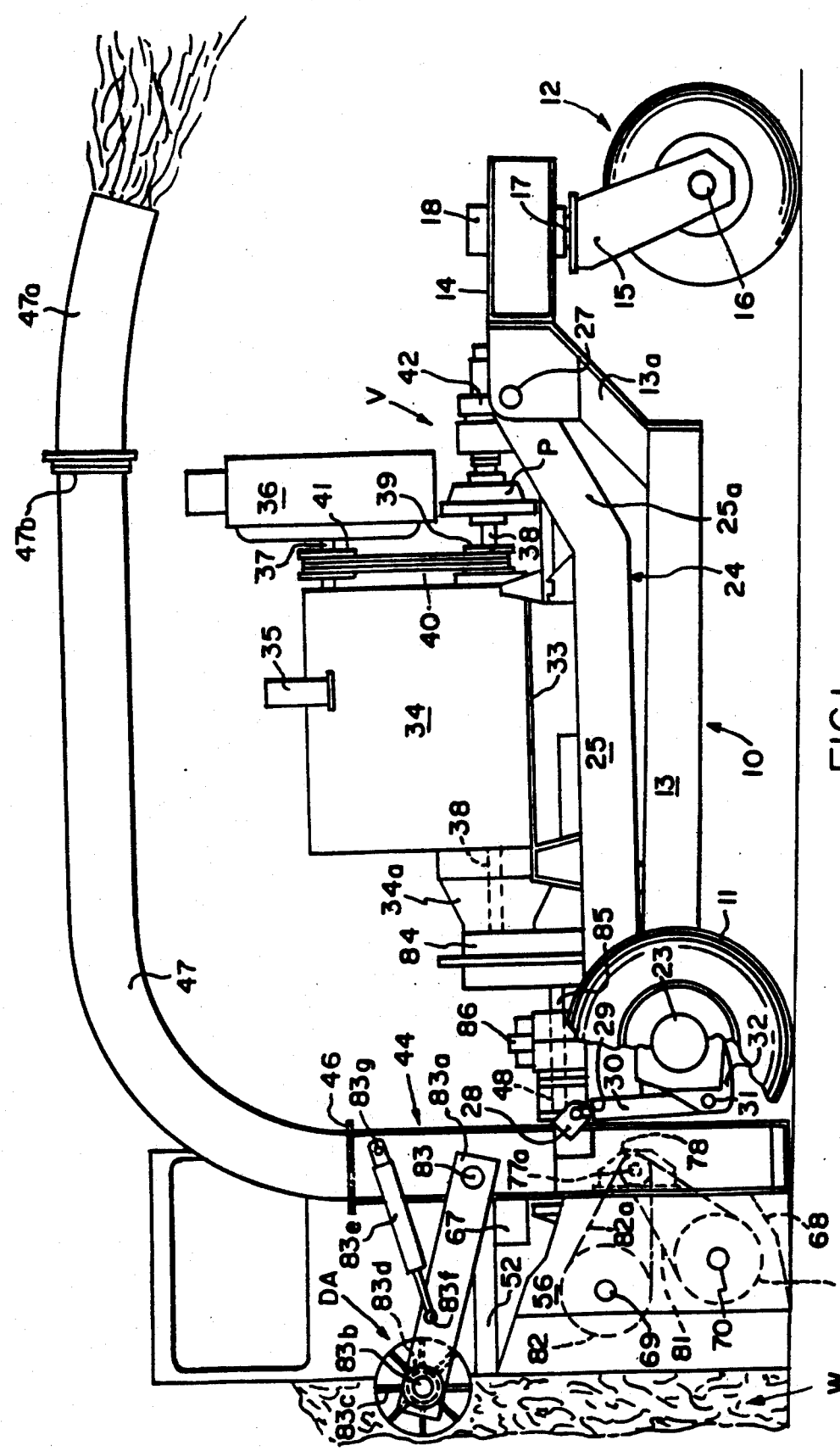
FIG. 1 is a schematic side elevational view of my self-propelled, compost windrow turning and aerating machine.

Referring now more particularly to the accompanying drawings, a letter V generally indicates the vehicle which includes a main frame, generally designated 10, supported on a pair of front wheels 11, and a rear caster wheel assembly, generally designated 12. As FIG. 4 indicates, frame 10, which is generally U-shaped in plan configuration, includes divergent legs 13, connected at their rear ends to upwardly angled portions 13a which are fixed to a leg spanning element 14 supported by the castered wheel assembly 12. The yoke 15, which connects to the axle 16 of the rear wheel assembly 12, includes a vertical spindle 17 which is rotatably received by a bearing member 18 provided on the element 14 to journal and axially fix the shaft 17 for rotary movement in a 360° path of rotation. Members 13 may also be connected by a brace 19 and by other suitable braces.

As FIG. 4 indicates, the respective frame legs 13 at each side of the machine, at their front ends, have housings 20, mounting independently operated rotary hydraulic motors 21 and 21a with output shafts 22 and 22a fixed to the respective wheel axles 23. Each of these motors 21 and 21a is independently reversible so that one of the motors may be driven in a forwarding direction while the other is driven in a reversing direction, and the vehicle can, in effect, be turned within virtually its own length about the axis of caster wheel assembly shaft 17.

Mounted on the main frame 10, is an upper subframe, generally designated 24, which includes side legs 25. At their rear ends, side legs 25 angle upwardly as at 25a and portions 25a are provided with clevis ends 25b (FIG. 4) to mount bearings 26 which are journaled on fixed pivot shaft 27 carried by the elements 13.

At its front end the subframe 24 supports fittings 28 mounting the piston rods 29 of hydraulic cylinders 30 which have their lower ends pivotally supported at 31 on brackets 32 fixed to the legs 13 of main frame 10. Mounted on the subframe 24, on a platform 33, is a diesel engine 34 having an exhaust stack 35. The engine 34 is a large engine having the power to drive all of the operating elements which are to be described. Engine 34 may be a 400 horsepower engine. Provided to air cool the engine 34, is a radiator 36 having a fan shaft 37 journaled by the engine 34. At its rear end, the engine drive shaft extends from engine 34 as at 38 and mounts a sheave assembly 39, which, via belts 40, drives the sheave assembly 41 provided on shaft 37. Also driven by the extending rear end of shaft 38 which is journaled by bearings 42 provided on the subframe 24, is a hydraulic pump system, generally designated P, which includes several pumps to be later identified.

Figures 2, 3:
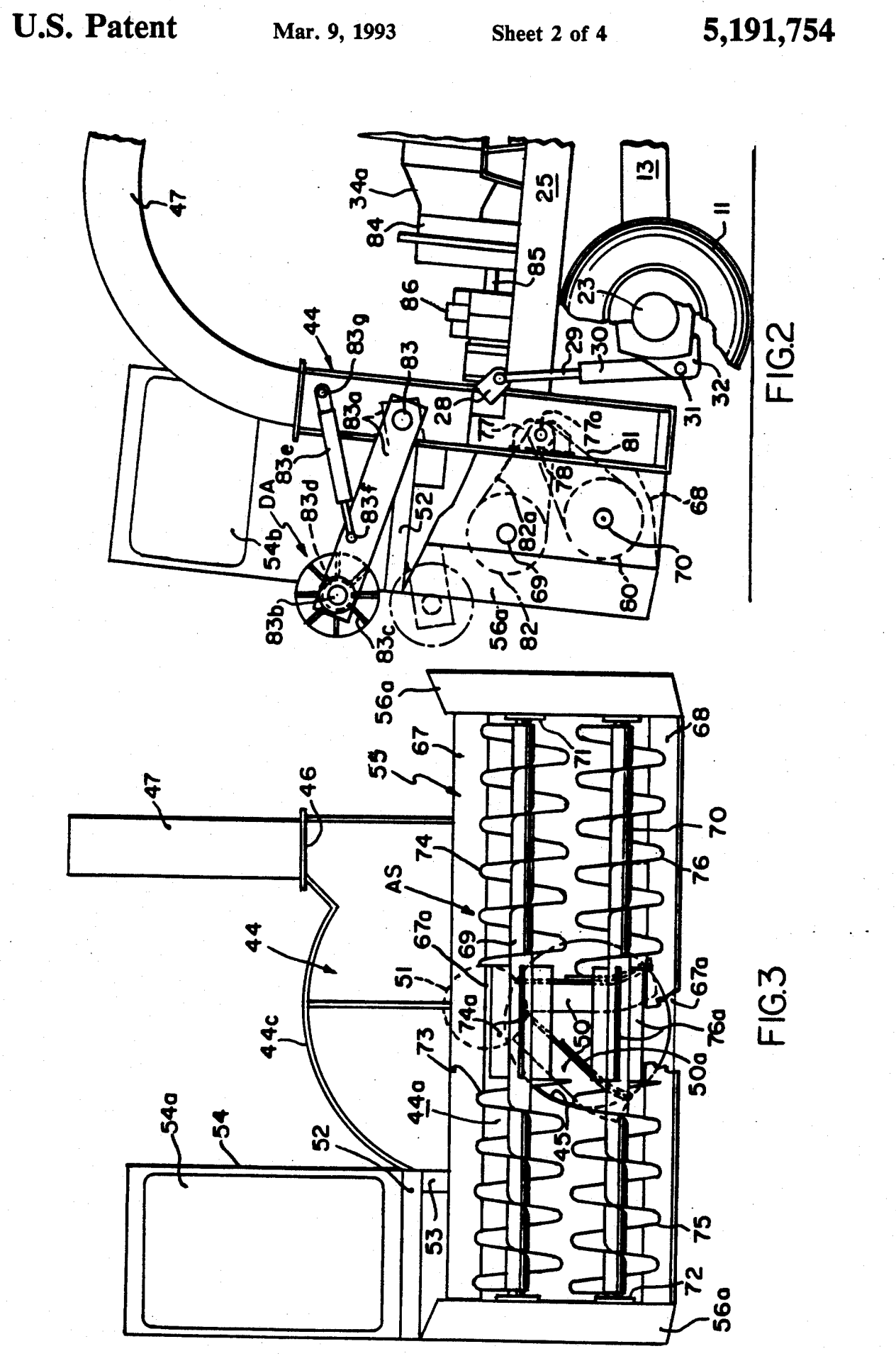

Fixed to the front end of subframe arms 25, is a blower housing, generally designated 44, having front and rear walls 44a and 44b respectively and a perimetral spanning wall 44c. Housing 44 is closed except for a material admitting opening 45 provided in its front wall (See FIG. 3) and a vertically extending spout fitting 46 having a swingable material directing spout 47. It is to be understood that the spout 47 is rotatably mounted on the spout fitting 46, and a rotary hydraulic motor or suitable hydraulic power cylinder is operable under the control of an operator in the usual manner to swing the spout 47 to the side, if it is desired to reform the windrow W to the side of the machine instead of directly to the rear thereof. Further, the spout 47 at its terminal end has a curvilinear outlet element 47a, rotatably mounted on the fitting 47b, which also can be powered by a suitable hydraulic motor or hydraulic cylinder to, for example, move to different adjusted positions.

As FIG. 5 illustrates, a fan shaft 48, journaled by a bearing 49 supported by subframe 24, extends into the blower housing 44 through an opening in the rear wall 44b thereof, and fan blades 50, fixed to a hub 51 keyed on shaft 48, generate the air stream which conveys the particulate material, admitted through the opening 45, out spout 47. Replaceable wear plates 50a are provided on the fan blades 50.

Framing members 52 and 53 affixed to the blower housing structure at one side support an operator's cab 54 which is open at its front and sides as at 54a and 54b for operator visibility purposes and it is to be understood that the operator sits in the cab 54 at the front of the self-propelled machine and manipulates the controls for the various operating elements which will be described.

Figure 6:
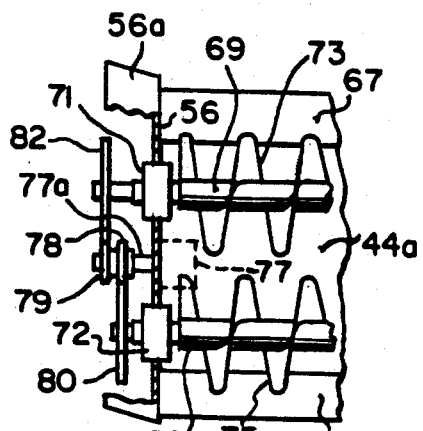
FIG. 6 is a fragmentary sectional elevational view demonstrating a manner in which the auger blade shafts may be driven.

Mounted in advance of the blower housing 44 and fixed thereto is a material debridging and feeding assembly generally designated 55 which includes end walls 56, connected by an upper rail 67, and a bottom wall 68 in the form of a scoop. Outturned divergent wings 56a are provided on the end walls 56 to guide material into an auger system generally designated AS. As FIG. 3 particularly discloses, a pair of vertically spaced apart parallel shafts 69 and 70 are journaled in bearings 71 and 72 provided on end walls 56. Left hand helical flights 73, and right hand helical flights 74, are fixed to shaft 69 and are spaced apart centrally at the location of the opening 45 provided in wall 44a so that both the flights 73 and 74 feed material centrally in opposition to one another. The wall 44a may be extended as at 67a to cover, not only the front of the blower housing, but also the rear ends of assembly 55 not covered by wall 44a. Similarly, centrally spaced left hand helical flights 75, and right hand helical flights 76, are fixed on the shaft 70, and each feeds material centrally in opposition one to the other to the location of the opening. Provided centrally on shaft 69 to assist the suction created to move material into opening 45, are paddles 74a, and similar but narrower paddles 76a are provided on shaft 70 for the same purpose. The shafts 69 and 70 are driven in the same direction of rotation at the same speed of rotation by a rotary hydraulic motor 77 (See FIGS. 4 and 6) having an output shaft 77a mounting a pair of sprockets 78 and 79. Sprocket 78 drives a sprocket 80 fixed on shaft 70 via a chain 81, and the sprocket 79 drives a sprocket 82 fixed on the shaft 69 via a chain 82a.

A rotary debridging drum assembly DA forms an integral part of assembly 55 and is mounted for vertical swinging movement on pivots 83 carried by blower housing 44 and comprises arms 83a connected by a shaft 83b at their front ends, which is journaled by bearings in the arms. Shaft 83b fixedly mounts paddles 83c which rotate with shaft 83b. A rotary hydraulic motor 83d is coupled to continuously revolve shaft 83b. Further, arms 83a and shaft 83b may be swung vertically upwardly and downwardly by hydraulic cylinders 83e which are pivotally connected at 83f to arms 83a, and pivotally connected to frame housing 44 as at 83g to swing the drum assembly DA vertically as necessary in a debridging path of movement.

In addition to driving the various pumps utilized in pump system P, the engine 34 drives the blower fan shaft 48 in a manner which will now be described. A power take off housing 34a, affixed to engine 34, encases the front end of the engine drive shaft 38, which couples to the input shaft of a gearbox 84. The output shaft 85 of gearbox 84 leads to a coupling 86 which connects it to the blower fan shaft 48.

Figure 8:
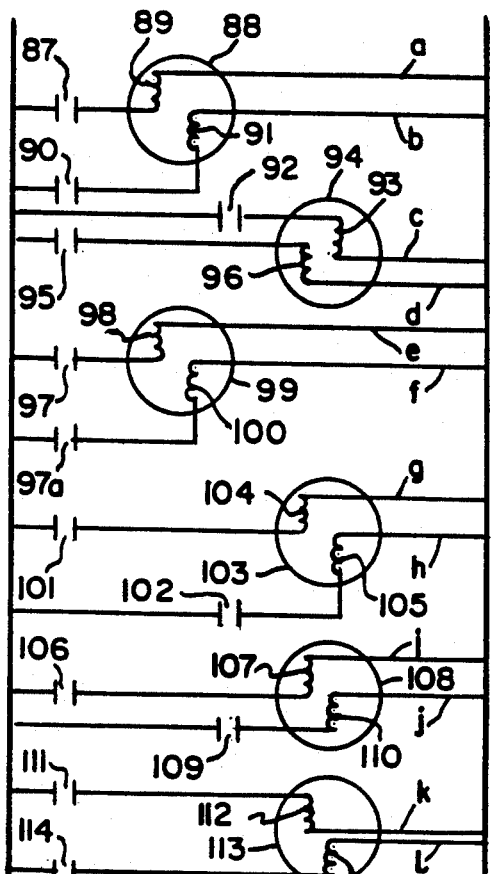
FIG. 8 is a greatly simplified, schematic control diagram for the conventional hydraulic actuators employed.

In FIG. 8 I have schematically illustrated a control system which will now be described. The system illustrated herein is only exemplary of many which are conventional and it is to be understood that the conventional components of the hydraulic system for operating the hydraulic motors and the hydraulic cylinder are all commercially available and do not form a part of the present invention. The control system may be electro-hydraulic, or fully hydraulic, and I have chosen to illustrate a valve system for directing hydraulic fluid from the various pumps to the various operating elements which are electrically controlled and operative in response to the closing of contacts. The various hand or foot operated controls will be accessible to an operator situated in cab 54 and may be used in conjunction with a conventional commercially available programmable controller. When hydraulic fluid under pump pressure is not proceeding to one of the operating elements it is being diverted to the reservoir of the conventional hydraulic system which I employ. Preferably, I employ separate pumps for furnishing hydraulic fuid independently to each of the front wheels 11 and 11a. A separate pump is also utilized for the motors driving the auger shafts 69 and 70 and the debridging wheel and for operating each pair of cylinders 30 and 83e. The pump operating cylinders 30 can also be empoyed to power the hydraulic motors (not shown) for operating the discharge spout components.

In FIG. 8, contacts 87 in a circuit line "a", control a valve 88 having a solenoid 89 which, when energized, passes hydraulic fluid to the motor 21 driving wheel 11 to cause it to revolve in a forward direction. Contacts 90 in circuit line "b" energize a solenoid 91 which delivers hydraulic fluid under pressure to the motor 21 driving wheel 11 in a direction to drive it in the opposite direction of rotation. Contacts 92 provided in a circuit line "c" are in circuit with a solenoid 93 incorporated with a valve 94 and, when closed, deliver fluid under pressure to the motor 21a driving wheel 11a to revolve it in a forward direction. Contacts 95, in a circuit line "d" in circuit with a solenoid 96 incorporated with valve 94, cause fluid to be delivered to the motor driving wheel 11a such that the wheel is driven in a reverse direction.

Contacts 97 in a circuit line "e" are in circuit with the solenoid 98 incorporated with a valve 99 which controls the hydraulic motor 77 driving auger shafts 69 and 70. Contacts 97a are in a circuit line "f" with the solenoid 100 which causes valve 99 to reverse the flow of fluid and drive motor 77 in a reversing direction, as, for instance, when it is desired to unjam the augers, or for any other purpose. Contacts 101 in a circuit line "g" are in circuit with a solenoid 104 for a valve 103 which delivers fluid to the cylinders 30 to advance their piston rods and raise the subframe 24, while bleeding fluid from the upper ends of the cylinders to the reservoir. Contacts 102 in circuit line "h" are in circuit with a solenoid 105 incorporated in valve 103 which causes hydraulic fluid to be fed to the opposite end of the pistons in cylinders 30 and lower the subframe 24, while bleeding fluid from the lower end of the cylinders 30 to the reservoir. Contacts 106 in circuit line "i" are in circuit with a solenoid 107 incorporated in valve 108 which causes hydraulic fluid to be fed to the motor 83d driving drum shaft 83b in the direction shown. To drive shaft 83b in the opposite direction, contacts 109 in circuit "j" energize solenoid 110. Contacts 111 provided in a circuit line "k" are in circuit with a solenoid 112 incorporated with a valve 113, which delivers fluid to the cylinders 83e to retract the cylinder piston rods and raise drum assembly DA. Similarly, contacts 114, provided in a circuit line "l" and in circuit with a solenoid 115 incorporated with valve 113, when closed, advance the piston rods to lower drum assembly DA while bleeding fluid from the lower end of the cylinders 83e.

THE OPERATION

It is to be understood that a windrow W may extend to a height of around fourteen feet and will consist of fragmented waste from which the plastic, glass, and metal has been removed. It may include wood fines, wood chips, leaves, garbage and various organic sludge. The sludge may be mixed with wood chips which act like sponges to take the sludge down to an acceptable level of water content.

It is necessary to turn over such composted material periodically, because it tends to build considerable heat and may emit a considerable stench. Turning it over and aerating it in the manner disclosed by applicant alleviates this, and aerates the material thoroughly to promote a much more rapid composting of the material.

In FIG. 1 the subframe 24 is shown in its lowermost position. In this position, trough-like bottom 68 will normally be an inch or two off the ground as the vehicle proceeds down the windrow. Assuming the windrow is a minimum height windrow and the length of auger assembly AS is sufficient to cover the width of the compost windrow, the vehicle can pretty much proceed continuously, because auger assembly AS typically extends to roughly a height of four feet. When the width of the windrow is such that some material lies outside the wings 56a, one or the other of the wheels 11 can be forwarded while the other is reversed to attain a pivot of the unit about the caster wheel assembly 12, so that the path taken by the machine may be a zig-zag path. The material which is exposed to the bite of the auger flights 73, 74 and 75, 76 is conveyed centrally in opposition such that it tends to be crowded into the blower opening 45. The considerable suction created by fan blades 50, which, typically, will be traveling at 10,000 feet per minute, aids in pulling the material into opening 45, as do paddles 74a and 76a. Once it enters the air stream created by fan blades 50, it is carried around in the airstream and expelled out the spout 47 in the manner indicated in FIG. 1 to reform a windrow in back of the vehicle.

Windrows W of somewhat greater height are frequently encountered, and when this occurs, the drum assembly DA can be raised as necessary to continuously debridge the material above auger assembly AS as the vehicle proceeds continuously. Typically, drum assembly DA can be raised to the level "y" FIG. 7 which may be five feet above the path T taken by the auger blades. While debridging is typically accomplished via revolving the assembly DA, which leads the auger assembly A, so that material falls into the path of the auger assembly, cylinder 83e can also be actuated to move the drum assembly up and down in an oscillating path of travel when a more severe debridging is required. The material is fed continuously by the auger system AS to the opening 45.

Figure 7:
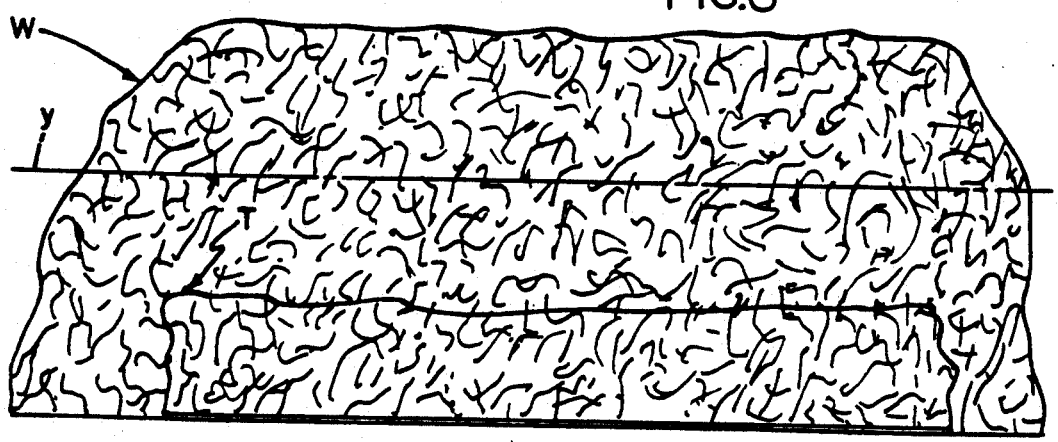
FIG. 7 is a schematic, transverse sectional view through a windrow which is being turned, illustrating the manner in which debridging of the material is accomplished.

In operation, the scoop floor 68 is in the neighborhood of an inch or two off the ground, as shown in FIG. 7, and in the absence of drum assembly DA, a cavity or tunnel T would tend to be formed, in a windrow of considerable height, which has an upper wall with other material being bridged above it. When the drum assembly DA is continuously operated, debridging of the material occurs and the material falls as the material below it permits to be collected and processed by the unit 55. Material falling off to the sides laterally may be collected by pivoting of the vehicle about the rear castered wheel assembly 12, in the manner already discussed.

To reform the windrow to a sidewisely adjacent position, the spout 47 can be turned ninety degrees laterally to distribute the material to the side. It has been found, however, that the machine works very well when the windrow is reformed in back of the vehicle as shown in FIG. 1, and this is the way the machine will operate in most instances.

It is further to be emphasized that the heavy operating units such as the engine 34, with radiator 36, the blower 44, and the debridging and feeding assembly 55 are carried by the subframe 24. The result of this, since pivot 27 is at the rear, is that their considerable weight is distributed to the front wheels 11 and 11a via the mount 32 and main frame 10 so that the rear wheel 12 bears relatively little weight and can caster freely and easily.

It is to be understood that the embodiments described are exemplary of various forms of the invention only and that the invention is defined in the appended claims which contemplate various modifications within the spirit and scope of the invention.

I claim:

1. In a self-propelled compost windrow turning and aerating machine:
    a. a longitudinally extending vehicle main frame having a front and rear end, supported on front and rear wheels;
    b. an upper longitudinally extending subframe having a front and rear end, supported from the rear end of said main frame for vertical movement relative to said main frame to raise and lower the front end of said subframe relative to said main frame;
    c. a blower housing mounted on said subframe and having a material admitting opening leading to a rotary fan provided in said housing, the blower housing having a discharge opening with a spout for directing material blown out of said housing by said fan to a desired discharge location;
    d. rotary shaft driven material feeding mechanism supported on said subframe in advance of said blower housing for vertical movement therewith, for removing material from a compost windrow and delivering it to said material admitting opening; and
    e. an engine drive system for powering said front wheels, said fan, and said material feeding mechanism.

2. The machine of claim 1 wherein said subframe is mounted for pivotal movement on said main frame about a horizontal axis extending crosswise of the main frame.

3. The machine of claim 1 wherein said blower housing extends crosswisely on said subframe and said fan is mounted on a longitudinally extending blower shaft.

4. The machine of claim 3 wherein said engine system comprises a singular engine with a power take-off shaft extending longitudinally therefrom and a coupling and gear box connect the take-off shaft with the blower shaft.

5. The machine of claim 1 wherein said material feeding mechanism comprises a housing with end walls, auger mechanism is journaled by said housing comprising a pair of superposed auger shafts, with right hand helical flights on one side and left hand helical flights on the other feeding the material centrally in opposed directions of flow to said material admitting opening in the blower housing.

6. The machine of claim 5 wherein a hydraulic motor powered by said engine drive system revolves said auger shafts and paddle plates are supported on said auger shafts in front of said material admitting opening.

7. The machine of claim 1 wherein there are a pair of front wheels and a single centrally disposed rear castered wheel, and a separate reversible hydraulic motor powered by said engine drive system drives each front wheel in rotation.

8. The machine of claim 1 wherein said engine system is supported on said subframe.

9. The machine of claim 1 wherein hydraulic cylinder means connected between said main frame and subframe at the front ends thereof is movable to support said subframe at varying levels.

10. The machine of claim 1 wherein a debridging device is supported on said subframe in a position above and extending forwardly of said material feeding mechanism to encounter material before it is encountered by said material feeding mechanism.

11. The machine of claim 10 wherein said debridging device includes a rotary shaft with flights thereon, and drive mechanism is provided to power said shaft.

12. The machine of claim 11 wherein said shaft spans a pair of pivotally mounted arms mounted for vertical swinging movement on said subframe to extend forwardly, and a drive mechanism is provided to swing said arms vertically in an oscillating path of movement.

13. In a self-propelled compost windrow turning and aerating machine:
    a. a longitudinally extending vehicle main frame having a front and rear end, supported on front and rear wheels;
    b. an upper longitudinally extending subframe having a front and rear end, supported for vertical movement relative to said main frame to raise and lower the front end of said subframe relative to said main frame;
    c. a blower housing mounted on said subframe and having a material admitting opening leading to a rotary fan device provided in said housing, the blower housing having a discharge opening with a spout for directing material blown out of said housing by said fan to a desired discharge location;

d. rotary shaft driven material debridging and feeding mechanism supported on said subframe in advance of said blower housing for vertical movement therewith, for removing material from a compost windrow and delivering it to said material admitting opening;

e. said material debridging and feeding mechanism including a housing with a rear wall and end walls, auger mechanism journaled by said housing comprising a pair of superposed auger shafts, with right hand helical flights on one side and left hand helical flights on the other, feeding the material centrally in opposed directions of flow to said material admitting opening in the blower housing; and f. an engine drive system for powering certain of said wheels, said fan device, and said material debridging and feeding mechanism.

14. The machine of claim 13 wherein said subframe is mounted for pivotal movement on the rear end of the main frame about a horizontal axis extending generally crosswise of the main frame.

15. The machine of claim 13 wherein mechanism connected between said main frame and subframe at the front ends thereof is movable to support said subframe at varying levels relative to said main frame.

16. The machine of claim 13 wherein said engine system is supported on said subframe, said blower housing extends generally crosswisely on said subframe and said fan is mounted on a longitudinally extending blower shaft coupled to a power takeoff shaft extending longitudinally from the engine system.

17. The machine of claim 13 wherein paddles are mounted on at least said upper auger shaft between said right and left hand helical flights in front of said material admitting opening; and a hydraulic motor powered by said engine drive system revolves said auger shafts.

18. In a method of turning and aerating a windrow of compost material with a self-propelled vehicle having a longitudinally extending, vehicle main frame with a front and rear end, supported on front and rear wheels, there being: an upper longitudinally extending subframe having a front and rear end, supported from the rear end of said main frame for vertical movement relative to said main frame to raise and lower the front end of said subframe relative to said main frame; a blower housing mounted on said subframe and having a material admitting opening leading to a rotary fan provided in said housing, the blower housing having a discharge opening with a spout for directing material blown out of said housing by said fan to a desired discharge location; a rotary shaft driven material debridging and feeding mechanism supported on said subframe in advance of said blower housing for vertical movement therewith, for removing material from a compost windrow and delivering it to said material admitting opening; and an engine drive system for powering wheels, said fan, and said material debridging and feeding mechanism, the steps of:

a. advancing the vehicle along a windrow of a substantially greater height than said debridging and feeding mechanism while simultaneously moving the debridging and feeding mechanism to debridge the material and collect it with the debridging and feeding mechanism;

b. feeding the material collected to said material admitting opening; and c. blowing the material in a path to form another windrow of the material.

19. The method of claim 18 wherein said frame is supported on a pair of front wheels and a single castered rear wheel, each of said front wheels being independently driven so that one can be driven forwardly while the other is driven reversely to pivot said vehicle about the castered wheel, and wherein said vehicle is advanced in a zig zag path along the windrow.

* * * * *